(No Model.) 4 Sheets—Sheet 1.
J. EDGAR.
THILL COUPLING.
No. 372,366. Patented Nov. 1, 1887.
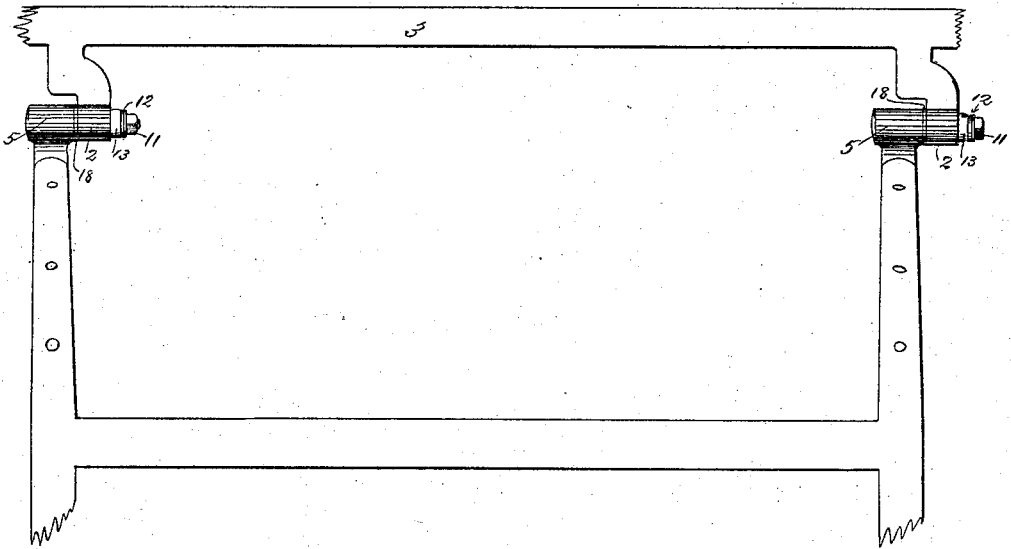
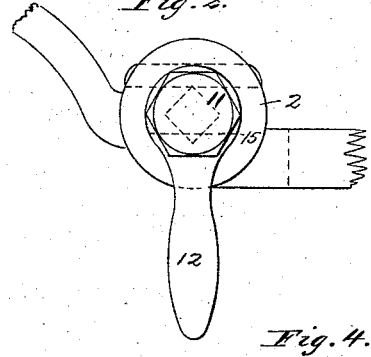
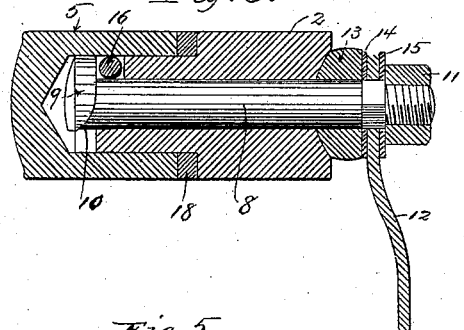
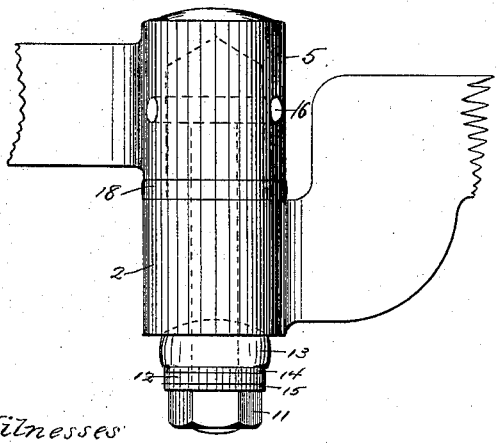
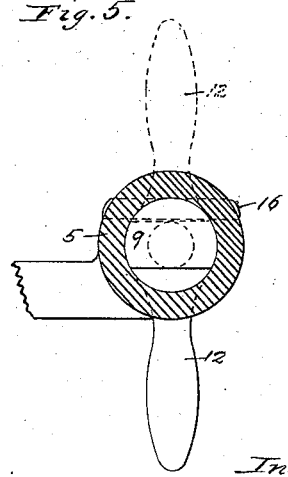
Witnesses
R. H. Sanford
A. M. Gaskell
Inventor
John Edgar
By O. C. Paul atty.

(No Model.)

4 Sheets—Sheet 2.

J. EDGAR.
THILL COUPLING.

No. 372,366. Patented Nov. 1, 1887.

Witnesses
R. H. Sanford
A. M. Gaskell

Inventor
John Edgar
By A. C. Paul atty (No Model.) 4 Sheets—Sheet 3.
J. EDGAR.
THILL COUPLING.
No. 372,366. Patented Nov. 1, 1887.
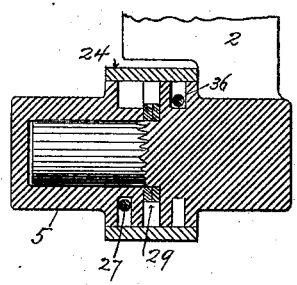
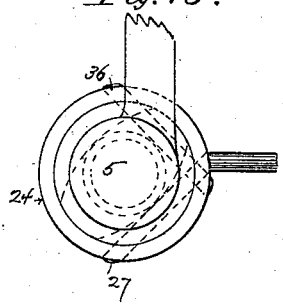
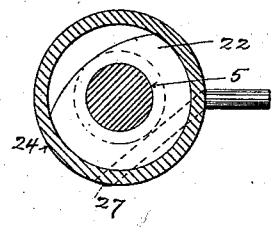
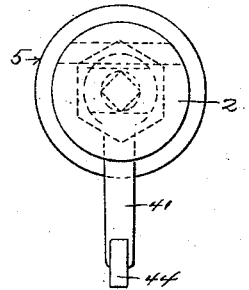
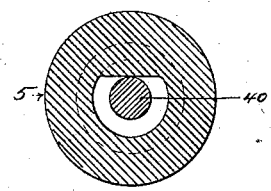
Witnesses
R. H. Sanford
A. M. Gaskell
Inventor
John Edgar
By A. C. Paul Atty
N. PETERS, Photo-Lithographer, Washington, D. C.

(No Model.) 4 Sheets—Sheet 4.

J. EDGAR.
THILL COUPLING.

No. 372,366. Patented Nov. 1, 1887.

Witnesses.
R. H. Sanford
S. J. Beardslee.

Inventor.
John Edgar.
By R. C. Paul Atty.

UNITED STATES PATENT OFFICE.

JOHN EDGAR, OF ROCHESTER, MINNESOTA.

THILL-COUPLING.

SPECIFICATION forming part of Letters Patent No. 372,366, dated November 1, 1887.

Application filed March 9, 1887. Serial No. 230,222. (No model.)

*To all whom it may concern:*

Be it known that I, JOHN EDGAR, of Rochester, in the county of Olmsted and State of Minnesota, have invented certain Improvements in Thill-Couplings, of which the following is a specification.

This invention relates to improvements in devices for coupling the thills, shafts, or poles of buggies, wagons, or other vehicles to the axles or running-gear; and the object I have in view is to provide a compact, strong, and durable coupling that will be free from rattling and from cutting, and capable of being quickly connected or disconnected for the purpose of changing from poles to thills, or the reverse.

This coupling consists, essentially, of a fixed axle secured upon the running-gear and a hub that is fixed upon the thills or pole, and is adapted to fit upon the fixed axle that forms the other member of the coupling. The axles project in a lateral direction, and both in the same direction, so that the thills or poles are coupled to the running-gear by moving the hubs laterally onto the fixed axles. The hubs are secured upon the axles by a latching device that is capable of being turned upon its axis, and thereby locking the two members of the coupling together. Rubber or other springs are provided between the two members of the coupling to prevent any rattling, and in some instances the latching device may be arranged to draw the two members together at the same time that it locks them.

The invention will be more fully understood from the following detailed description, taken in connection with the accompanying drawings, in which—

Figure 6:
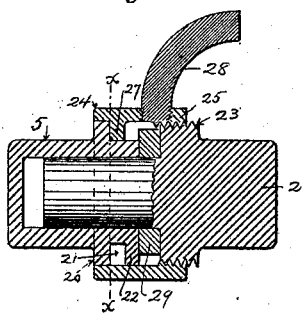
Figure 7:
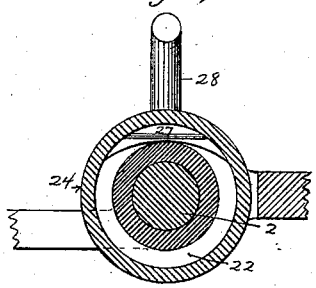
Figure 8:
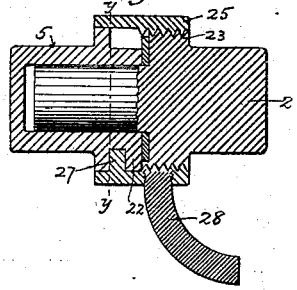
Figure 9:
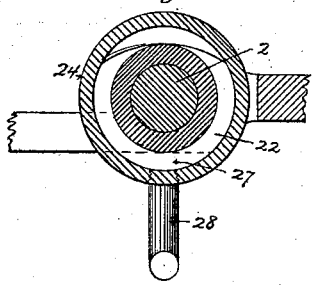
Figure 10:
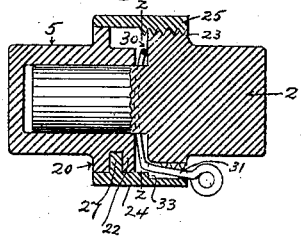
Figure 11:
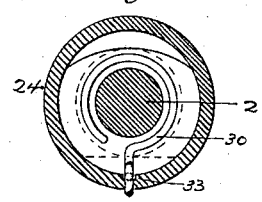
Figure 18:
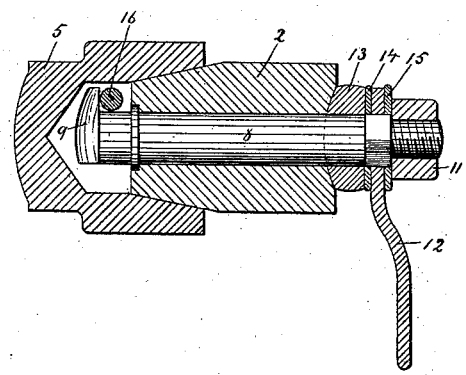

Figure 1 is a plan view of a portion of a vehicle running-gear and thills secured together by my improved coupling. Fig. 2 is an end elevation of one of the couplings. Fig. 3 is a longitudinal section through one of the couplings. Fig. 4 is a plan view of one of the couplings. Fig. 5 is a cross-section of the coupling shown in Fig. 3 with the end of the latching device in elevation, and showing by dotted lines the latching device in position for releasing the coupling. Fig. 6 is a longitudinal section of the coupling with the axle in elevation, showing a modified latching device. Fig. 7 is a section on line X X of Fig. 6. Fig. 8 is a view similar to Fig. 6, but showing the parts locked together. Fig. 9 is a section on line Y Y of Fig. 8. Fig. 10 is a section similar to that shown in Fig. 8, but with a locking-spring on the latching device. Fig. 11 is a section on line Z Z of Fig. 10. Fig. 12 is a longitudinal section showing another modification of latching device. Fig. 13 is an end elevation of the coupling shown in Fig. 12. Fig. 14 is a section on line S S of Fig. 12. Fig. 15 is a longitudinal section of the coupling, showing another form of latch. Fig. 16 is an end elevation of the coupling shown in Fig. 15. Fig. 17 is a section of the same on line O O of Fig. 15. Fig. 18 is a view similar to Fig. 3, but showing conical bearing-surfaces on the spindle and hub.

In all of the figures of the drawings, 2 represents the fixed axle, which is secured to and projects in a lateral direction from the axle-tree 3 or other part of the running-gear, and 5 represents a hub that is adapted to fit upon this axle and is secured to the thills or pole. The fixed axle and the hub that fits thereon constitute the two members of the coupling. These two parts of the coupling are essentially the same in all the figures of the drawings.

The fixed axles of the two couplings on any vehicle will project in the same direction, as shown in Fig. 1, and the hubs may be placed on the axles by a sidewise movement. When the hubs are in place, the latching device will be operated, and thereby the parts will be secured together.

Any suitable latching device may be used with the coupling. I have shown several varieties of devices for this purpose, all operating on substantially the same principle.

The latching device shown in Figs. 1 to 5 consists of a bolt, 8, that passes through a central opening in the fixed axle 2. The bolt is provided with a head, 9, that is cut away at one side, as shown in Figs. 3 and 4, and the under side of the head has an incline, 10, at each side of the cut-away portion, as shown in Fig. 3. The bolt is screw-threaded at its opposite end and provided with a nut, 11. Beneath the nut is a handle, 12, that is secured to the bolt, preferably by fitting upon a polygonal portion formed upon the shank of the bolt. A rubber or other spring, 13, is placed around the bolt between the handle 12 and the end of the axle.

Washers 14 and 15 may be arranged between the nut and the handle and between the handle and the spring.

The hub 5 is provided with a pin or flange, 16, that extends across the bore of the hub, as shown in Figs. 2, 3, and 5. This pin preferably extends across the upper part of the bore of the hub. The flange of the bolt-head preferably projects from the opposite side of the bolt from the handle 12, as shown in Fig. 3, so that when the handle is turned up to the position shown by dotted lines in Fig. 5 the cut-away portion of the head comes opposite the pin 16 in the hub, and the hub can be slipped over the axle until the head of the bolt is inside the pin, when, by turning the handle down to the position shown in Fig. 3, the flange of the head will grasp the pin 16 and lock the hub upon the axle. The incline on the under side of the head rides over the pin and facilitates the operation of the latch. A suitable gasket or packing, 18, may be arranged between the base of the axle and the end of the hub, as shown in Fig. 3, to exclude dust and dirt from the joint.

In Figs. 6, 7, 8, and 9 I have shown the hub 5 provided with a ring or flange, 20, on its outer surface, and with a ring or flange, 22, that extends around the hub at a short distance from the ring 20, thus leaving a small space, 21, between the two rings, as shown in Figs. 6 and 8. The flange 22 is cut away at its upper side, as shown in Fig. 7.

The base of the axle 2 is provided with a screw-thread, 23, and a band, 24, having a screw-thread, 25, in one end, is mounted upon this part of the axle, with its screw-thread engaging the thread 23. When the hub is in place on the axle, the other end of the band fits over the rings 20 and 22 on the outside of the hub.

The band 24 is provided with a segmented flange, 27, as shown clearly in Fig. 7, which is adapted to pass over the cut-away portion of the flange 22 and to enter the space 21 between the two flanges 20 and 22. The band is preferably provided with a handle, 28, by means of which it may be turned on the hub. The segmented flange may be a pin extending across a portion of the band, as shown in Figs. 12 and 13, if preferred.

A packing-ring, 29, is arranged on the axle 2, so that it will be compressed between the base of the axle and the end of the hub, and will prevent any rattling of the parts of the coupling. As the band is turned from the position shown in Figs. 6 and 7 to that shown in Figs. 8 and 9, the segmented flange in the band passes between the flanges on the hub and locks the hub upon the axle. At the same time the band is screwed farther onto the axle, and thereby the hub is drawn upon the axle and the packing is compressed. The parts will thus be held so closely together that all possibility of working loose or rattling is precluded.

Instead of using a rubber packing, I may use a coil-spring, 30, between the hub and the base of the axle, as shown in Figs. 10 and 11, and the end of this spring may pass out through a recess, 31, in the base of the hub, and be adapted to spring into a recess, 33, in the band, and lock it after it has been given a half-revolution on the axle. With this device the band cannot be reversed to unlock the coupling until the spring is pressed out of the recess.

The latching device shown in Figs. 12, 13, and 14 is similar to that shown in Figs. 6, 7, 8, and 9, except that instead of being secured to the base of the axle by a screw-thread the band has a flange or pin, 36, that engages an annular recess on the base of the axle and moves therein as the band is rotated on the axle and hub.

In Figs. 15, 16, and 17 the axle is provided with a recess, 37, in which is placed a nut, 38, that is secured therein by a pin, 39. The latch-bolt 40 has a threaded portion that engages the thread in this nut. On the end of the bolt is a handle, 41, by means of which the bolt may be turned on its axis. The hub fits over the outer surface of the axle, and is provided on its interior with a segmented flange, 42, as in Figs. 2 and 3. The flanged head of the latch-bolt engages this segmented flange in the hub as the bolt is turned on its axis and locks the hub upon the axle. At the same time as the bolt is turned it is screwed farther through the nut 38, and thereby draws the hub farther onto the axle.

A spherical rubber packing, 43, may be placed on the latch-bolt, where it will be compressed between the end of the hub and the axle, and will prevent any looseness of the joint.

The handle 41 may be provided with a spring-latch, 44, that will spring into a recess on the axle when the parts are coupled together and hold the handle in position, as shown in Fig. 15.

A spiral or other suitable spring may in each instance be substituted for the rubber packing on the axle.

It will be seen that every form of locking device consists of a rotatable latch on the fixed hub having a flange that engages a flange on the hub. It will also be seen that the hub is free to oscillate upon the axle with the movement of the thills, while any endwise movement is prevented by the latching device.

The axle may, if preferred, be of conical shape, with the interior of the hub corresponding thereto, as shown in Fig. 18, so that any wear of the parts will be compensated by drawing the hub farther upon the axle.

By this form of coupling more strength is secured than with the ordinary forms, as the strain comes upon the large fixed axle, and the coupling has also the advantage of being free from rattling, and of being capable of being quickly connected or disconnected when it is desired to attach or remove the thills or pole.

The same construction shown and described as a thill-coupling might be used as a hinge for a door, gate, or shutter in any place where it is desirable to hold the parts together.

I claim as my invention—

1. A thill-coupling comprising a laterally-projecting fixed axle having a conical bearing-surface, a hub having a conical opening adapted to fit upon said axle, and having a segmental flange, and a rotary latching device upon said axle constructed and arranged to engage the flange on the hub and lock said hub upon said axle, substantially as described.

2. A thill-coupling comprising a laterally-projecting fixed axle, a hub having an opening adapted to fit upon said axle, and having a segmented annular flange, and a rotary latching device upon said axle constructed and arranged to engage the flange on the hub and lock said hub upon said axle, substantially as described.

3. The combination, in a thill-coupling, of a laterally-projecting fixed axle, a hub fitting upon said axle and capable of oscillating thereon, an elastic spring or packing between said hub and the base of the axle, and a rotary latching device on said axle adapted to engage said hub and lock it upon said axle, substantially as described.

4. The combination, in a thill-coupling, of a fixed laterally-projecting axle, a hub fitting upon said axle and provided with a segmented flange, and a rotary screw-threaded latching device adapted to engage said flange upon the hub and engaging a threaded portion of the axle, whereby as said latching device is turned it engages said hub and draws it farther upon the axle, substantially as described.

5. The combination, in a thill-coupling, of a fixed axle, 2, a hub, 5, fitting upon said axle and provided with a segmented flange, an elastic packing between said hub and the base of said axle, and a rotary latching device adapted to engage said hub and having a screw-threaded engagement with said axle, whereby as the latching device is turned it engages said hub and draws it farther upon the axle and compresses said packing.

6. The combination, in a thill-coupling, of a fixed axle, 2, a hub, 5, fitting thereon and provided in its interior with a segmented flange, and a latch-bolt passing centrally through said axle and provided with a flanged head adapted to engage said flange in the hub, substantially as described.

7. The combination, in a thill-coupling, of a fixed axle, 2, a hub, 5, fitting thereon and provided on its interior with a segmented flange, a latch-bolt passing centrally through said axle and having a flanged head adapted to engage the flange in said hub, and an elastic packing between said hub and the base of said axle, substantially as described.

8. The combination, in a thill-coupling, of a fixed axle, 2, a hub, 5, fitting thereon and having a segmented flange, a rotary latching device on said axle adapted to engage said flange, and a spring-catch arranged to hold said latching device in its locking position, substantially as described.

In testimony whereof I have hereunto set my hand this 25th day of February, 1887.

JOHN EDGAR.

In presence of—
ARTHUR L. GORE,
C. J. PORTER.